UNITED STATES PATENT OFFICE.

FRIEDRICH KRÜGER, OF MÜHLHEIM, NEAR FRANKFORT-ON-THE-MAIN, GERMANY, ASSIGNOR TO A. LEONHARDT & CO., OF SAME PLACE.

MEDICAL COMPOUND.

SPECIFICATION forming part of Letters Patent No. 401,501, dated April 16, 1889.

Application filed November 10, 1888. Serial No. 290,472. (No specimens.)

*To all whom it may concern:*

Be it known that I, FRIEDRICH KRÜGER, a subject of the Emperor of Germany, and a resident of Mühlheim, near Frankfort-on-the-Main, Germany, have invented a new and useful Medical Compound, of which the following is a specification.

Baumann has described in the reports of the German Chemical Society, 1885, page 884, (*Berichte der Deutschen Chemischen Gesellschaft*, 1885, 884, ff.) a few mercaptols of most specific properties.

I have discovered a new mercaptol which is essentially different from any known. It is produced in the following manner: 9.6 kilos methylmercaptan, obtained in the well-known manner, are mixed with fifty-eight kilos acetone, and, the mixture well cooled under constant cooling, gaseous hydrochloric acid is introduced, when a reaction takes place, through which methylmercaptol is formed according to the formula $(CH_3SH)_2 + (CH_3)_2CO = (CH_3)_2C(SCH_3)_2 + H_2O$. This methylmercaptol, forming a clear colorless oily liquid, is separated from the water formed along with it in this reaction, and the surplus of acid is washed out. For a further purification, the mercaptol can be distillated by means of steam. It has less specific gravity than water, and smells less strong and disagreeable than the ethylmercaptan. It proves to be very volatile. As means of condensation, instead of gaseous hydrochloric acid, also an aqueous solution of hydrochloric or sulphuric acid can be employed; but in all events it is necessary to keep the temperature very low to avoid losses. This methylmercaptol is transformed into the corresponding disulphonate by oxidation with permanganate of potassium according to the following formula: $(CH_3)_2C(SCH_3)_2 + 4O = (CH_3)_2C(SO_2CH_3)_2$. This tetramethyl-disulphonmethane is to be used as a substitute for morphine in producing sleep. It is soluble in water and crystallizes in large rhombic leaves. Its melting-point was found to be between 119° and 120° centigrade, (uncorrected atmospheric pressure.)

Having thus described my invention and the manner of employing the same, what I claim, and wish to have secured to me by Letters Patent of the United States of America, is—

The medical compound herein described, having the formula $(CH_3)_2C(SO_2CH_3)_2$, and the properties of being easier soluble in water than sulphonal, crystallizing in large white rhombic scales or plates, its melting-point being 119° to 120° centigrade, (uncorrected,) being turned at this temperature directly from the crystal form into the liquid one.

In testimony whereof I have signed my name to this specification in the presence of two subscribing witnesses.

FRIEDRICH KRÜGER.

Witnesses:
 JOSEPH PATRICK,
 ALVESTO P. HOGUE.